United States Patent [19]
Inamine

[11] Patent Number: 6,125,748
[45] Date of Patent: Oct. 3, 2000

[54] COMPUTER DATA PRINT-OUT SYSTEM USING STENCIL PRINTER

[75] Inventor: Noboru Inamine, Ibaraki-ken, Japan

[73] Assignee: Riso Kagaku Corporation, Tokyo, Japan

[21] Appl. No.: 09/265,699

[22] Filed: Mar. 10, 1999

[30] Foreign Application Priority Data

Dec. 3, 1998 [JP] Japan .................................. 10-060772

[51] Int. Cl.$^7$ ...................................................... B41C 1/14
[52] U.S. Cl. ........................................ 101/128.4; 101/484
[58] Field of Search .............................. 101/114, 128.21, 101/128.4, 484; 400/61, 76

[56] References Cited

U.S. PATENT DOCUMENTS

| | | | |
|---|---|---|---|
| 5,751,923 | 5/1998 | Matsuzawa | 395/114 |
| 5,809,879 | 9/1998 | Yokoyama et al. | 101/128.4 |
| 5,873,659 | 2/1999 | Edwards et al. | 400/61 |

FOREIGN PATENT DOCUMENTS 4303543  8/1994  Germany .

*Primary Examiner*—Ren Yan
*Attorney, Agent, or Firm*—Nixon Peabody LLP; Donald R. Studebaker

[57] ABSTRACT

A computer data print-out system using a stencil printer includes a computer provided with a printer driver, a stencil printer with a stencil master unit and a computer interface unit connected between the computer and the stencil printer. The printer driver makes print data and inputs the print data into the computer interface unit, the computer interface unit makes output data for the stencil printer on the basis of the print data input from the printer driver and inputs the output data into the stencil printer, and the stencil printer makes a stencil master and makes print using the stencil master. The printer driver recognizes the output resolution at which the stencil printer can make print and makes print data which conforms to the output resolution of the stencil printer.

2 Claims, 4 Drawing Sheets

PRIOR ART

COMPUTER DATA PRINT-OUT SYSTEM USING STENCIL PRINTER

BACKGROUND OF THE INVENTION

1. Field of the Invention

This invention relates to a computer data print-out system using a stencil printer with a stencil master making means, and more particularly to a computer data print-out system using a stencil printer with a stencil master making means which causes the stencil printer to print out data made by a computer such as a personal computer.

2. Description of the Related Art

Recently, data made by a personal computer is often printed out by a printer. When printing out character data andor image data made by a personal computer, a printer driver exclusive for a particular type of printer is installed in the personal computer. The printer driver converts the character data and the like made by the personal computer to resolution-dependent raster image data which conform to the resolution of the printer in response to print command from the application side and makes resolution-dependent print data including the raster image data and print control data. The printer driver inputs the resolution-dependent print data thus made into the printer and causes the printer to print out the data made by the personal computer. Accordingly when the type of the printer connected to a personal computer is changed, the printer driver generally must be changed according to the type of the printer to be connected to the personal computer.

Further, there has been known a stencil printer with a stencil master making means which reads out an image on an original to make image data, makes a stencil master according to the image data and prints out a number of copies using the stencil master. Further there has been proposed a computer interface unit for a stencil printer which connects such a stencil printer to a personal computer to input print data output from the personal computer to the stencil printer and causes the stencil printer to make print according to the print data. Such a system including a stencil printer with a stencil master making means, a computer interface unit and a computer will be referred to as "a computer data print-out system using a stencil printer", in this specification.

FIG. 5 shows a conventional a computer data print-out system using a stencil printer which carries out printing according to print data output from a personal computer. The system comprises a personal computer 1, a stencil printer 3 with a stencil master making unit and a computer interface unit 2 connected between the personal computer 1 and the stencil printer 3. The computer interface unit 2 receives resolution-dependent print data from the personal computer 1, makes page print data (output data) for the stencil printer 3 on the basis of address data, raster image data, page discharge data and the like in the resolution-dependent print data, and inputs the output data into the stencil printer 3. The stencil printer 3 makes print according to the output data input from the computer interface unit 2. Further it is possible to cause the stencil printer 3 to make print according to print data output from another personal computer 4 through, for instance, a LAN.

In the conventional system, the personal computer makes print data conforming to the resolution of the stencil printer connected to the computer interface unit and the computer interface unit is generally not provided with resolution changing function. Accordingly, in a system where stencil printers of different resolutions, e.g., 300 dpi, 400 dpi and 600 dpi, are selectively connected to the computer interface unit, image information cannot be output in correct print positions and deformation of the image such as expansion and contraction of the image or image avalanche can be generated in the printed image if the resolution of the stencil printer actually connected to the computer interface unit differs from that the personal computer has expected.

Further, in the case where the personal computer can make print data only in a predetermined resolution, it is possible to arrange the computer interface unit to convert the resolution of the print data as output from the personal computer to that for a stencil printer which is expected to be connected to the computer interface unit. However also in this case, if a stencil printer of different resolution is connected to the computer interface unit, normal printing cannot be obtained.

Further when print data output from a remote personal computer which is connected to the computer interface unit through, for instance, a LAN, is to be printed, the operator of the personal computer cannot know the resolution of the stencil printer and it is difficult for the operator to conform the print data to the resolution of the stencil printer.

SUMMARY OF THE INVENTION

In view of the foregoing observations and description, the primary object of the present invention is to provide a computer data print-out system using a stencil printer with a stencil master making means in which a single type of printer driver can properly drive any one of a plurality of types of stencil printers which are different from each other in resolution and are selectively connected to a computer interface unit.

The computer data print-out system using a stencil printer of the present invention comprises a computer provided with a printer driver, a stencil printer having a stencil master making means provided integrally therewith and a computer interface unit connected between the computer and the stencil printer which are arranged so that the printer driver makes print data and inputs the print data into the computer interface unit, the computer interface unit makes output data for the stencil printer on the basis of the print data input from the printer driver and inputs the output data into the stencil printer, and the stencil printer makes a stencil master according to the output data and makes print using the stencil master, wherein the improvement comprises that said printer driver recognizes the output resolution at which the stencil printer can make print and makes print data which conforms to the output resolution of the stencil printer.

It is preferred that the computer interface unit be provided with a resolution input means which reads out the output resolution from the stencil printer at which the stencil printer can make print and inputs output resolution data representing the output resolution into the computer, and the printer driver recognizes the output resolution of the stencil printer on the basis of the output resolution data.

The expression "print data which conforms to the output resolution of the stencil printer" means print data in which the resolution of the raster image data is acceptable for the stencil printer. That is, though it is most preferred that the "print data which conforms to the output resolution of the stencil printer" be print data whose raster image has resolution identical to the output resolution of the stencil printer, the resolution of the raster image of the "print data which conforms to the output resolution of the stencil printer" need not be exactly equal to the output resolution of the stencil printer. For example, when the printer driver cannot select a resolution which is exactly equal to the output resolution of the stencil printer, the resolution of the raster image may be such a resolution at which the stencil printer can make print of an acceptable quality.

In the computer data print-out system of the present invention, a stencil printer having a stencil master making section formed integrally with a printing section is employed. The stencil master making section is provided with, for instance, a line type thermal head and perforates a stencil master material according to an image signal, thereby making a stencil master. The printing section has a printing drum around which the stencil master is wound and ink supplied inside the printing drum is transferred to a printing paper through perforations in the stencil master. In the stencil printer with such a stencil master making section, the resolution of the thermal head governs the resolution of the stencil printer.

In the computer data print-out system of this invention, since the printer driver recognizes the output resolution at which the stencil printer can make print and makes print data which conforms to the output resolution of the stencil printer, print data which conforms to the output resolution of the stencil printer can be constantly input into the computer interface unit irrespective of the output resolution of the stencil printer, whereby normal printing free from deformation of the image such as expansion and contraction of the image or image avalanche can be obtained. Further the operator of the personal computer need not recognize the output resolution of the stencil printer to be connected to the computer interface unit. Further since a plurality of stencil printers which are different from each other in the output resolution can be connected to the computer interface unit, the degree of freedom of arrangement of the system can be increased.

Further, when the system is arranged so that the computer interface unit is provided with a resolution read-out means, and the printer driver recognizes the output resolution of the stencil printer on the basis of the output resolution data input from the resolution read-out means, the printer driver may be basically the same as the conventional printer driver except that it receives the output resolution data and makes print data to conform to the output resolution of the stencil printer, whereby the present invention can be easily carried out.

DESCRIPTION OF THE PREFERRED EMBODIMENT

Figure 1:
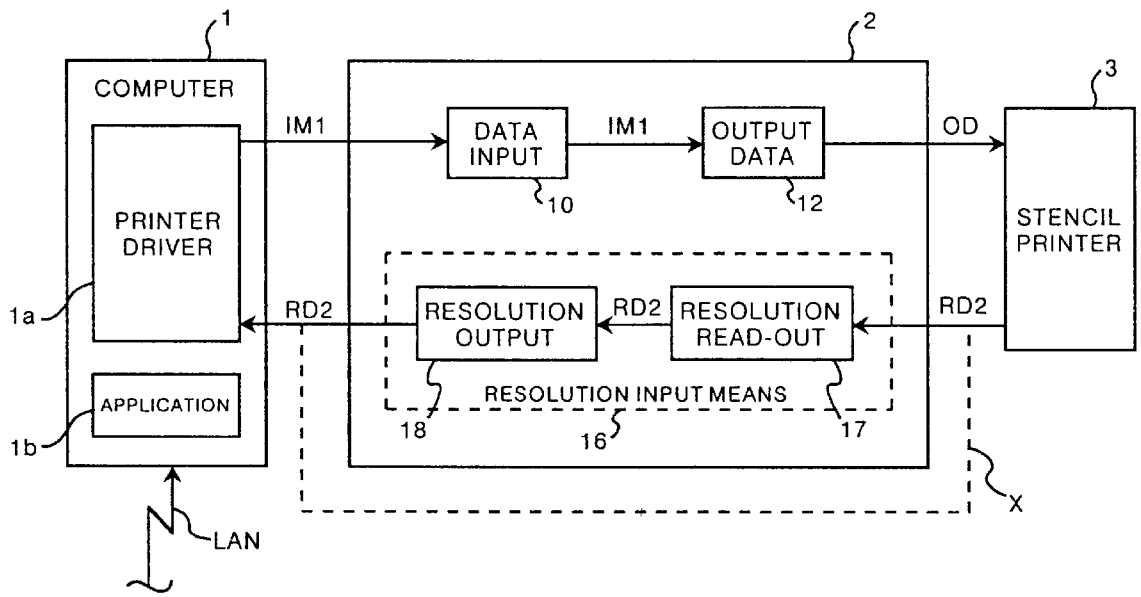
FIG. 1 is a block diagram showing a computer data print-out system in accordance with an embodiment of the present invention.

In FIG. 1, a computer data print-out system in accordance with an embodiment of the present invention comprises a personal computer 1, a stencil printer 3 with a stencil master making means and a computer interface unit 2 which connects the stencil printer 3 to the personal computer 1. A printer driver 1a has been installed in the personal computer 1. The printer driver 1a converts data (character data, image data and the like) made by various applications 1b installed in the personal computer 1 to raster image data IM1 at a predetermined resolution and makes print data including the raster image data IM1 and other print control data.

The computer interface unit 2 comprises a data input means 10 which takes in print data consisting of the raster image data IM1, address data, page discharge data and the like made (parallel data in this particular embodiment) by the personal computer 1, an output data making means 12 which makes page print data (output data) OD for the stencil printer 3 on the basis of the print data and outputs the output data OD to the stencil printer 3, and a resolution input means 16 comprising a resolution read-out means 17 which reads out the output resolution at which the stencil printer 3 can make print and a resolution output means 18 which inputs the output resolution data RD2 into the computer 1.

In the computer data print-out system of this embodiment, the resolution read-out means 17 of the computer interface unit 2 reads out the output resolution of the stencil printer 3 and the resolution output means 18 inputs output resolution data RD2 representing the output resolution of the stencil printer 3 into the personal computer 1.

The printer driver 1a in the personal computer 1 converts the character data, image data and the like made by the application 1b to a raster image data IM1 at a resolution which conforms to the resolution of the stencil printer 3 as input from the computer interface unit 2 and makes print control data such as address data, page discharge data and the like which are required when the computer interface unit 2 makes the output data OD. Then the printer driver 1a outputs print data consisting of the raster image data IM1, the address data, the page discharge data and the like to the computer interface unit 2.

The data input means 10 of the computer interface unit 2 takes in the print data made by the personal computer 1 and inputs the print data into the output data making means 12. The output data making means 12 makes output data OD on the basis of the print data and inputs the output data OD into the stencil printer 3. The stencil printer 3 makes a stencil master on the basis of the output data OD and makes print on the stencil master.

Thus in this embodiment, since the printer driver 1a recognizes the output resolution of the stencil printer 3 by way of the output resolution data RD2 input from the computer interface unit 2 and makes print data which conforms to the output resolution of the stencil printer 3, print data which conforms to the output resolution of the stencil printer 3 can be constantly input into the computer interface unit 2 irrespective of the output resolution of the stencil printer 3, whereby normal printing free from deformation of the image such as expansion and contraction of the image or image avalanche can be obtained.

Though, in the arrangement described above, the printer driver 1a recognizes the output resolution of the stencil printer 3 by way of the output resolution data RD2 input from the resolution input means 16 in the computer interface unit 2, it is possible to arrange the personal computer 1 to detect the output resolution of the stencil printer 3 directly from the stencil printer 3 as shown by the dotted line X in FIG. 1. In this case, the personal computer 1 may be provided with a resolution read-out means similar to the resolution read-out means 17 shown in FIG. 1, or the printer driver 1a may be arranged to be able to read out the output resolution of the stencil printer 3.

When another personal computer is connected to the personal computer 1 by way of a LAN or the like, print data made by said another personal computer can be input into the stencil printer 3 by way of the personal computer 1.

Figure 2:
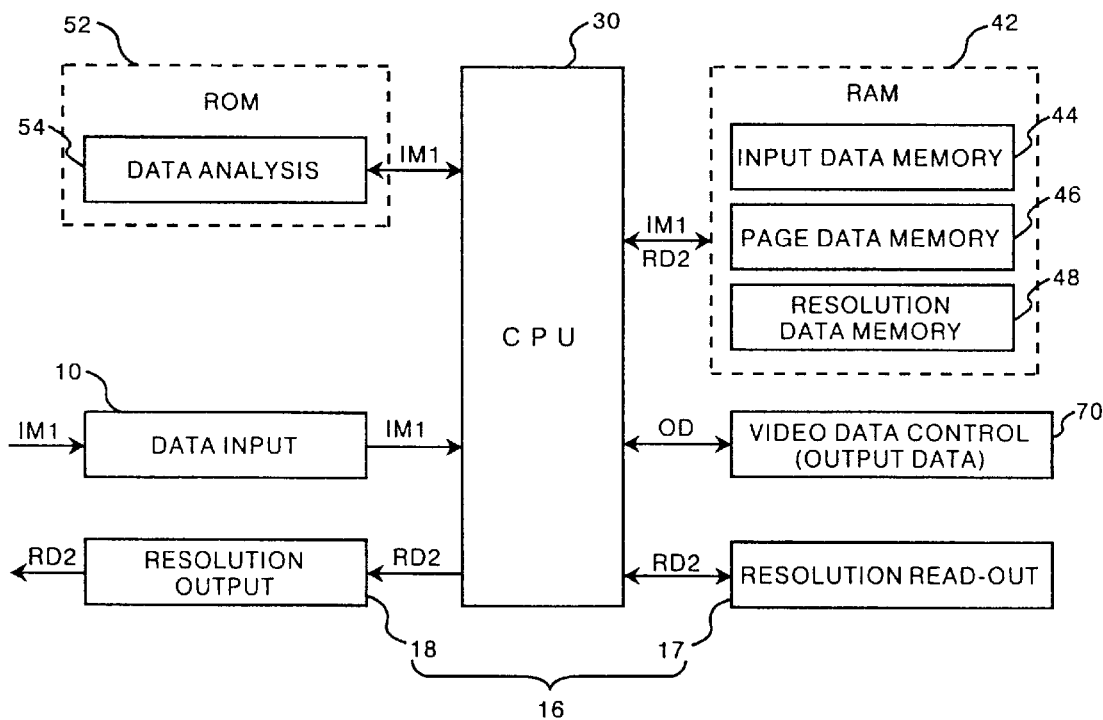
FIG. 2 is a block diagram showing an example of the computer interface unit in the computer data print-out system shown in FIG. 1.

FIG. 2 shows a concrete example of the computer interface unit 2. As shown in FIG. 2, the computer interface unit 2 comprises a data input means 10 which is connected to the personal computer 1 and takes in the print data output from the personal computer 1, and a CPU 30 which variously processes the print data taken in by the data input means 10 and makes the output data OD for the stencil printer 3.

A RAM 42 including an input data memory 44, a page data memory 46 and a resolution data memory 48, a ROM 52 including a data analysis means 54, a resolution input means 16 comprising a resolution read-out means 17 which reads out the output resolution of the stencil printer 3 and a resolution output means 18 which inputs into the computer 1 output resolution data RD2 representing the output resolution of the stencil printer 3 read out by the resolution read-out means 17 are connected to the CPU 30. A video data control means 70 which outputs the output data OD to the stencil printer 3 is further connected to the CPU 30. The CPU 30, the RAM 42, the ROM 52 and the video data control means 70 form the output data making means 12 shown in FIG. 1. The resolution read-out means 17 and the video data control means 70 are connected to the stencil printer 3.

Figure 3:
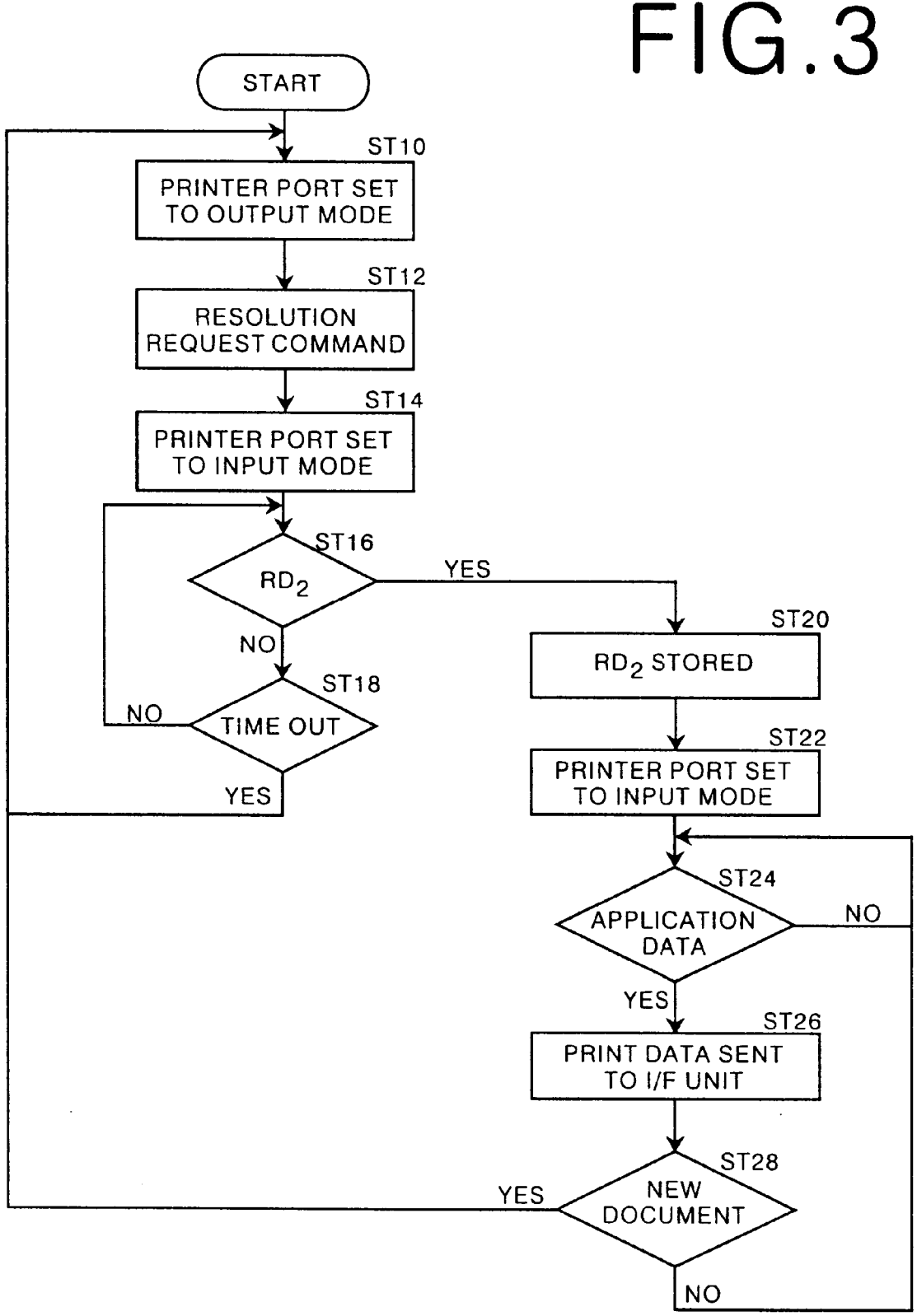
FIG. 3 is a flow chart for illustrating the operation of the personal computer employed in the system shown in FIG. 1.
Figure 4:
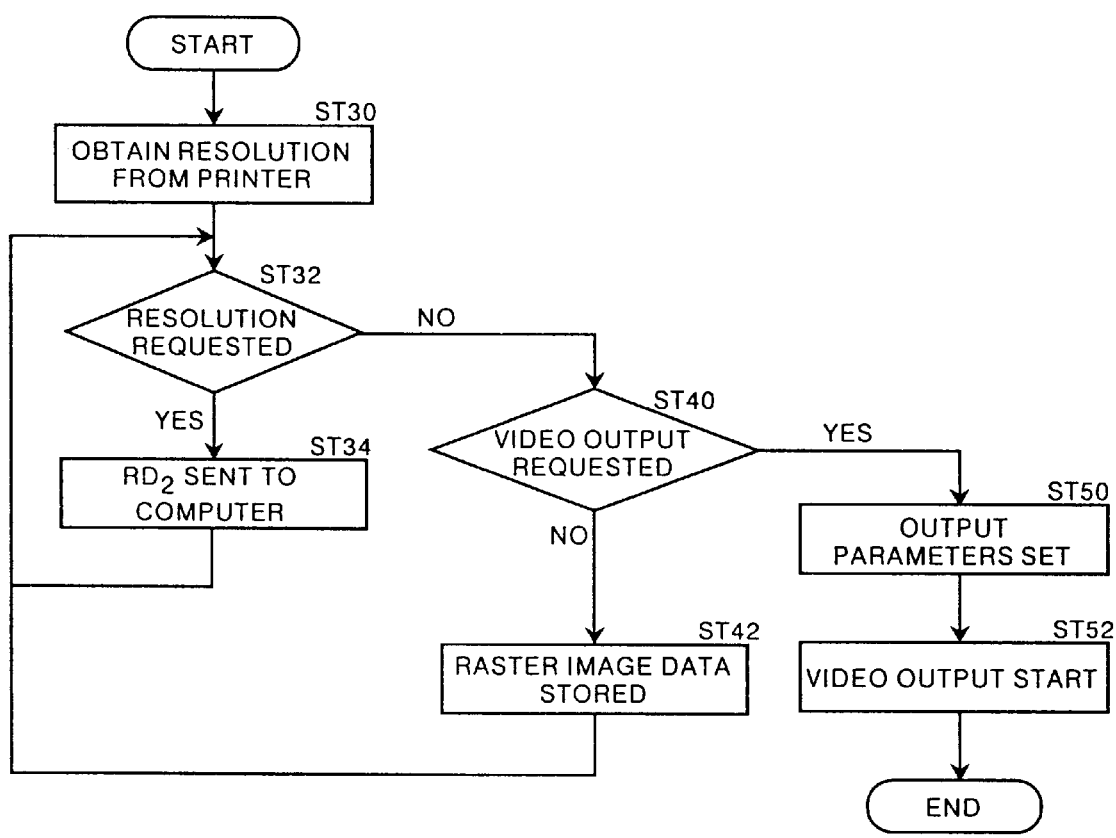
FIG. 4 is a flow chart for illustrating the operation of the computer interface unit.
Figure 5:
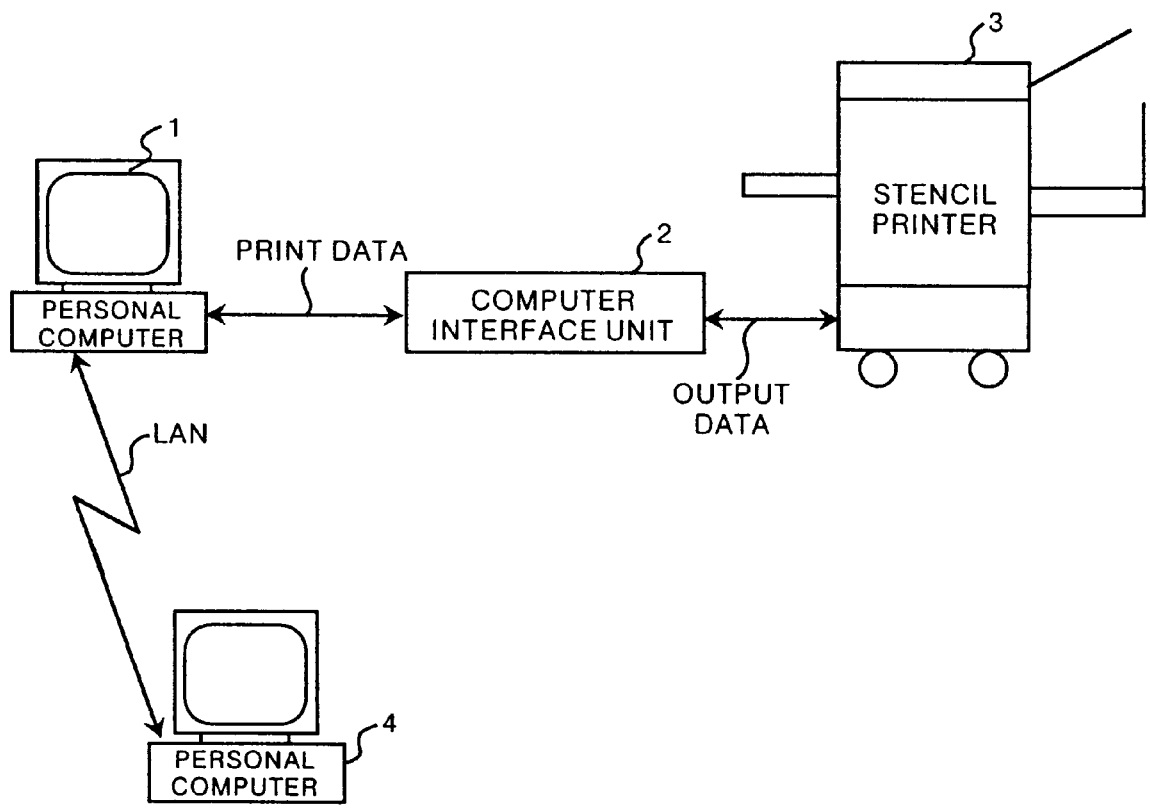
FIG. 5 is a schematic view showing a conventional computer data print-out system.

The operation of the computer data print-out system employing the computer interface unit 2 shown in FIG. 2 will be described with reference to FIGS. 3 and 4, hereinbelow. FIG. 3 shows the operation of the personal computer 1 and FIG. 4 shows the operation of the computer interface unit 2.

In order to obtain the output resolution data RD2 of the stencil printer 3 prior to making the print data, the printer driver 1a in the personal computer 1 sets a two-way printer port (e.g., LAN, serial, two-way parallel or the like) to an output mode (step ST10) and outputs to the computer interface unit 2 a resolution request command which requests the computer interface unit 2 to read out the output resolution of the stencil printer 3 (step ST12).

The computer interface unit 30 obtains in advance the output resolution data RD2 from the stencil printer 3 by way of the resolution read-out means 17 and stores the output resolution data RD2 in the resolution data memory 48 (step ST30). Upon receipt of the resolution request command from the personal computer 1, the computer interface unit 2 reads out the output resolution data RD2 from the resolution data memory 48 and inputs the same to the resolution output means 18, thereby making preparation for output of the output resolution data RD2 (step ST32).

When the printer driver 1a switches the two-way printer port to an input mode (step ST 14), the computer interface unit 2 sends the output resolution data RD2 to the personal computer 1 (step ST34). Upon receipt of the output resolution data RD2 from the computer interface unit 2, the personal computer 1 stores the output resolution data RD2 in memory built in the personal computer 1. (steps ST16 and ST20) After storage of the output resolution data RD2 is completed, the personal computer 1 sets the two-way printer port to the output mode. (step ST22) If the output resolution data RD2 cannot be received in a predetermined time, the processing is returned to step ST 10. (steps ST16 and ST18)

Upon receipt of print data (application data) from the application 1b after setting the two-way printer port to the output mode (step ST24:YES), the printer driver 1a reads out the output resolution data RD2 from the memory and converts the application data to raster image data IMI which conforms to the output resolution of the stencil printer 3 on the basis of the output resolution data RD2. At the same time, the printer driver 1a makes print control data such as address data, page discharge data and the like which are required when the computer interface unit 2 makes the output data OD. Then the printer driver 1a sends print data including the raster image data IM1, the address data and the like to the computer interface unit 2. Then after completion of transfer of print data for one page, the page discharge data is sent to the computer interface unit 30. (step ST26)

In the computer interface unit 30, the CPU 30 takes in the print data by way of the data input means 10 and stores the print data in the input data memory 44 in the RAM 42.

The print data output from the personal computer 1 includes the raster image date IM1 representing the contents of printing, the address data representing the printing position on a page, the page discharge data representing the end of a page and the like. The print data is read out from the input data memory 44, is analyzed by the data analysis means 54 and divided into the raster image data IM1, the address data, the page discharged data and the like.

The computer interface unit 2 outputs the raster image data IM1 to the page data memory 46 referring to the address data divided before the page discharge data and temporarily stores the same in the page data memory 46. (step ST42) The raster image data IM1 stored in the page data memory 46 forms a page print data OD. After the page discharge data is divided by the data analysis means 56, various parameters for the stencil printer 3 such as the number of the printings, the printing rate and the like are set (step ST50) and the output data OD is read out from the page data memory 46 and input to the stencil printer 3 by way of the video data control means 70 (step ST52).

Since the print data transferred from the personal computer 1 to the computer interface unit 2 has been made to conform to the output resolution of the stencil printer 3, the output data OD also conforms to the output resolution of the stencil printer 3. Accordingly when the stencil printer 3 makes print according to the output data OD, normal prints free from deformation of the images can be obtained.

What is claimed is:

1. A computer data print-out system using a stencil printer comprising a computer provided with a printer driver, a stencil printer having a stencil master making device provided integrally therewith and a computer interface unit connected between the computer and the stencil printer such that said printer driver recognizes an output resolution at which the stencil printer can make print and includes a print data generator for generating print data conforming to an output resolution of said stencil printer based on the recognition by said printer driver and inputs the print data into the computer interface unit, the computer interface unit makes output data for the stencil printer on the basis of the print data input from the printer driver conforming to the output resolution of the stencil printer and inputs the output data into the stencil printer, and the stencil printer makes a stencil master according to the output data and makes print using the stencil master.

2. A computer data print-out system as defined in claim 1 in which the computer interface unit is provided with a resolution input means which reads out the output resolution from the stencil printer at which the stencil printer can make print and inputs output resolution data representing the output resolution into the computer, and the printer driver recognizes the output resolution of the stencil printer on the basis of the output resolution data.

* * * * *